United States Patent
Kuriu

(10) Patent No.: US 7,014,920 B2
(45) Date of Patent: Mar. 21, 2006

(54) ANTI-FOGGING, STRETCHED, MULTILAYER FILM EXCELLENT IN QUICK-ACTING PROPERTY AND METHOD FOR PRODUCING THE SAME

(75) Inventor: Hiroki Kuriu, Moriyama (JP)

(73) Assignee: Gunze Limited, (JP)

( * ) Notice: Subject to any disclaimer, the term of this patent is extended or adjusted under 35 U.S.C. 154(b) by 252 days.

(21) Appl. No.: 10/258,201

(22) PCT Filed: Apr. 16, 2001

(86) PCT No.: PCT/JP01/03212

§ 371 (c)(1),
(2), (4) Date: Oct. 17, 2002

(87) PCT Pub. No.: WO01/78980

PCT Pub. Date: Oct. 25, 2001

(65) Prior Publication Data

US 2003/0049471 A1    Mar. 13, 2003

(30) Foreign Application Priority Data

Apr. 18, 2000    (JP) .............................. 2000-116525

(51) Int. Cl.
*B32B 27/00* (2006.01)
*B32B 27/08* (2006.01)
*B32B 27/34* (2006.01)

(52) U.S. Cl. ................. 428/474.4; 428/34.1; 428/34.3; 428/34.9; 428/35.2; 428/35.7; 428/36.8; 428/36.91; 428/451; 428/474.7; 428/474.9; 428/475.8; 264/176.1

(58) Field of Classification Search ............. 428/474.4, 428/212, 34.9, 35.2, 35.4, 36.7, 500, 910, 428/913, 105, 34.1, 34.3, 36.8, 36.91, 451, 428/474.7, 474.9, 475.8; 264/176.1
See application file for complete search history.

(56) References Cited

U.S. PATENT DOCUMENTS

| | | | |
|---|---|---|---|
| 4,695,491 A * | 9/1987 | Kondo et al. ............. | 428/34.9 |
| 4,909,726 A * | 3/1990 | Bekele ...................... | 428/34.3 |
| 5,635,286 A * | 6/1997 | Morita et al. .............. | 428/213 |
| 6,602,590 B1 * | 8/2003 | Ting et al. ................. | 428/218 |
| 6,726,968 B1 * | 4/2004 | Porter ....................... | 428/35.2 |
| 6,803,113 B1 * | 10/2004 | Porter et al. ............ | 428/474.4 |
| 6,846,530 B1 * | 1/2005 | Porter et al. .............. | 428/34.9 |
| 2002/0168489 A1 * | 11/2002 | Ting et al. ................ | 428/35.4 |
| 2002/0192446 A1 * | 12/2002 | Hatley et al. .............. | 428/212 |

FOREIGN PATENT DOCUMENTS

| | | |
|---|---|---|
| JP | 59-212261 | 12/1984 |
| JP | 07-052334 | * 2/1995 |
| JP | 07-052334V | 2/1995 |
| JP | 08-0255961 | 1/1996 |
| JP | 10-146931 | 6/1998 |
| WO | WO 98/47704 | 10/1998 |

* cited by examiner

*Primary Examiner*—P. Hampton Hightower
(74) *Attorney, Agent, or Firm*—Knobbe Martens Olson & Bear, LLP

(57) ABSTRACT

An anti-fogging, stretched, multilayer film comprising a layer having an anti-fogging agent incorporated therein, the film having evaluated values for anti-fogging property of 28 mm$^2$ or more at temperatures of −5° C. and 15° C., respectively.

9 Claims, No Drawings

ANTI-FOGGING, STRETCHED, MULTILAYER FILM EXCELLENT IN QUICK-ACTING PROPERTY AND METHOD FOR PRODUCING THE SAME

This application is the U.S. National Phase under 35 U.S.C. §371 of International Application PCT/JP01/03212, filed Apr. 16, 2001, which claims priority to Japanese Patent Application No. 2000-116525, filed Apr. 18, 2000. The International Application was not published under PCT Article 21(2) in English.

TECHNICAL FIELD

The present invention relates to a stretched, multilayer film capable of exhibiting an excellent anti-fogging property at the initial stage in packaging food products.

BACKGROUND OF THE INVENTION

Generally, moisture evaporated from food products condenses on the inner surface of a film used for packaging a variety of water-containing food products, such as raw meats, minced meats, hams, sausages, fresh vegetables, seafoods, other processed food products, etc., thereby resulting in poor visibility of the packed food products. Therefore, to prevent this disadvantage, an anti-fogging property is one of the attributes expected of the film. Especially, when raw meats, minced meats and the like are packed at a store counter and immediately put in a showcase for sale, the anti-fogging effect must work immediately. In such a case, the temperature in the showcase ranges from about −5° C. to about 5° C. Although the temperature at which fresh vegetables and the like are stored in the showcase varies depending on the kind of item being displayed, it is generally higher than that for raw meats, ranging from about 0° C. to about room temperature.

When a stretched, multilayer film is used, the desired anti-fogging effect cannot be obtained due to disadvantages caused by stretching of the film, use of additives in the anti-fogging layer, migration of an anti-fogging agent provided in inner layers to outer layers when the film is stored in a roll, etc. Further, it is difficult to attain an immediate anti-fogging effect.

Japanese Unexamined Patent Publication No. 52334/1995 discloses a resin film having an anti-fogging agent and an anti-slip agent incorporated therein. The heat-seal layer of the film disclosed therein contains an anti-fogging agent in an amount of 3,000 to 13,000 ppm and an anti-slip agent in an amount of 3,000 to 13,000 ppm, requiring improvements in its anti-fogging property, stretchability, etc.

In view of the above-described state of the art, an object of the present invention is to provide a film that can exhibit a quick-acting, anti-fogging property immediately after being used for packing at a store counter and that can preserve the commercial value of packed products attractive to consumers.

DISCLOSURE OF THE INVENTION

The features of the invention are presented in the following Items.

Item 1. An anti-fogging, stretched, multilayer film comprising a layer having an anti-fogging agent incorporated therein, the film having evaluated values for anti-fogging property of 28 mm² or more at the temperatures of −5° C. and 15° C., respectively.

Item 2. An anti-fogging, stretched, multilayer film according to Item 1 wherein the layer having an anti-fogging agent incorporated therein is a linear low density polyethylene resin layer comprising a fatty acid ester of polyalcohol in an amount of 15,000 to 30,000 ppm.

Item 3. An anti-fogging, stretched, multilayer film according to Item 1 having a structure of layers in the order of polyamide resin/saponified product of ethylene-vinyl acetate copolymer/polyamide resin/modified-polyolefin adhesive resin/linear low density polyethylene resin.

Item 4. An anti-fogging, stretched, multilayer film according to Item 1 having shrinkage rates in MD and TD of 10% or more, respectively, measured after being left to stand in hot water having a temperature of 80° C. for 30 seconds.

Item 5. A method for preparing an anti-fogging, stretched, multilayer film of Item 1 comprising annealing the film at a film surface temperature of 60 to 130° C.

Hereinbelow, a means to solve the problem is described in more detail and a mode for carrying out the invention is explained.

The stretched, multilayer film of the invention has a structure comprising a substrate layer enabling stretching and a sealing layer providing sealing and anti-fogging properties.

The substrate layer enabling stretching of the film is not limited. Examples include layers composed of polypropylene resins, polyethylene terephthalate resins, polyamide resins and the like. Among them, preferred resin layers include layers composed of polyamide resins such as 6-nylon and the like. Two or more of the above-described resins can also be used in combination for forming a substrate layer.

The sealing layer is also not limited. The sealing layer is a resin layer sealable by conventional sealing machines. Examples include layers composed of olefin resins and the like. Preferable examples of the olefin resins include linear low density polyethylenes, ethylene-vinyl acetate copolymers and the like.

The substrate layer and the sealing layer can be directly laminated to form a two-layer film by means of pressure bonding, heat-melting bonding, surface treatment (e.g., corona treatment, flame treatment) and the like. However, the substrate layer and the sealing layer are usually laminated by using an adhesive resin layer to form a film having a segmented structure composed of substrate layer/adhesive resin layer/sealing layer.

Further, in addition to the substrate layer and the sealing layer, a gas barrier layer may be provided depending on applications. Examples of gas barrier layers include layers composed of resins comprising saponified product of ethylene-vinyl acetate copolymer, xylylenediamine polyamide resin and the like. The saponified resins of ethylene-vinyl acetate copolymers are not limited. Examples include those having an ethylene content of 20 to 65 mol % and a saponification degree of 90% or more. The xylylenediamine polyamide resins are not limited. Examples include polymers prepared from meta-and/or para-xylylenediamines and dicarboxylic acids such as adipic acid or the like. The gas barrier layer can be disposed between the substrate layer and the sealing layer. When the film has two or more substrate layers, the gas barrier layer can be disposed between substrate layers. When the film has two or more sealing layers, the gas barrier layer can be disposed between sealing layers. The substrate layer and the gas barrier layer can be laminated without the adhesive resin layer. The sealing layer and the gas barrier layer can also be laminated without the adhesive resin layer.

The following are multilayer structures within the preferred embodiment of the film of the invention using the various resins described above: polyamide resin (substrate layer)/saponified product of ethylene-vinyl acetate copolymer (gas barrier layer)/polyamide resin (substrate layer)/modified-polyolefin adhesive resin (adhesive resin layer)/linear low density polyethylene resin (sealing layer); polyamide resin (substrate layer)/xylylenediamine polyamide resin (gas barrier layer)/polyamide resin (substrate layer)/modified-polyolefin adhesive resin (adhesive resin layer)/linear low density polyethylene resin (sealing layer); and like 5-layer structures.

The preferable thickness of each resin layer is as follows: 3 to 10 $\mu$m for each of the two substrate layers, 2 to 5 $\mu$m for the gas barrier layer, 1 to 5 $\mu$m for the adhesive resin layer, 5 to 15 $\mu$m for the sealing layer and 15 to 45 $\mu$m for the thickness of the entire film.

When a 3-layer film composed of substrate layer/adhesive resin layer/sealing layer is used, the thickness of the substrate layer is 8 to 20 $\mu$m, the thickness of the adhesive resin layer is 1 to 5 $\mu$m, the thickness of the sealing layer is 5 to 15 $\mu$m and the thickness of the entire film is 14 to 40 $\mu$m.

Insofar as the effects of the invention are not impaired, the film of the invention may contain other polymers as well as organic additives, such as antioxidants, heat stabilizers, lubricants, UV-absorbers and the like.

An anti-fogging effect of the stretched, multilayer film of the invention can be attained by incorporating an anti-fogging agent into the sealing layer. Anti-fogging agents, as used herein, include any of those having an anti-fogging effect that is commercially available as an "anti-fogging agent" or an "anti-static agent". Typical examples include fatty acid esters of polyalcohols, ethylene oxide adducts of higher fatty acid amines, higher fatty acid alkanol amides and the like. These compounds can be used alone or in a combination of two or more species.

Anti-fogging agents made from the fatty acid esters of polyalcohols are especially effective when a linear low density polyethylene is used as the resin for the sealing layer.

The amount of anti-fogging agent added to the sealing layer is preferably 15,000 to 30,000 ppm, more preferably 17,000 to 25,000 ppm, based on the weight of resin used for the sealing layer, although variable depending on the type of resin used for the sealing layer, the type of anti-fogging agent, etc. An amount less than 15,000 ppm is not preferred because the anti-fogging effect, particularly the immediate anti-fogging effect, is not sufficiently attained. An amount more than 30,000 ppm is not preferred because, although the anti-fogging property is attained, other problems occur, such as impaired film formation, blooming, etc.

These anti-fogging agents are arranged on the film surface with the hydrophilic groups facing outward and the lipophilic groups facing inward, thereby increasing the hydrophilicity of the surface of the macromolecular film. As a result, moisture condensed at the film surface spreads in a thin-film manner without forming water droplets. Thus, the fogging of the film surface is prevented. Therefore, for achieving an effective initial anti-fogging property, this uniform spreading of water is important at early stages. And, control for an optimum balance is required among disturbing factors such as temperature condition during extrusion stretching, amounts of antioxidant, heat stabilizer, lubricant and the like organic additives added to the film, and so on.

A value evaluated for the quick or immediate anti-fogging effect of the film of the invention represents a state that a droplet of water spreads to an area of 28 mm$^2$ or more at a temperature of $-5°$ C., preferably 40 mm$^2$ or more, more preferably 50 to 100 mm$^2$, similarly 28 mm$^2$ or more at a temperature of 15° C., preferably 40 mm$^2$ or more, more preferably 50 to 100 mm$^2$. Although a film having an anti-fogging property that is evaluated as being lower than the above specified range can be used depending on factors such as the amount of product to be packaged, moisture content thereof, etc., a film having an anti-fogging property that is evaluated as being 28 mm$^2$ or more at temperatures of $-5°$ C. and 15° C. is preferred for packaging various moisture-containing foods such as raw meats, minced meats, hams, sausages, fresh vegetables, seafoods, and other processed food products.

The anti-fogging property is evaluated as follows: introduce 10 $\mu$l of distilled water into a micro syringe; position the needle point thereof as close as possible to a film that is placed on a plotting paper lying horizontally with the anti-fogging surface of the film facing upward; drop the distilled water; and, 10 seconds later, measure the area of the water spread on the film in reference to the plotting paper having the grid lines.

The amount of the other additives (e.g., antioxidant, heat-stabilizer, lubricant and so on) to be used together with the anti-fogging agent is determined in consideration of factors like the film's structure, production conditions, intended use, as well as the type of each additive, and the like. The total amount of the additives (excluding the amount of the anti-fogging agent) is preferably in a proportion of 10 parts by weight or less based on the resin used for the sealing layer. If a large amount exceeding 10 parts by weight is added, the anti-fogging effect might not be attained, adversely affecting the desired arrangement of anti-fogging agent at the film surface.

The film of the invention is biaxially stretched, either sequentially or simultaneously, 2 to 5 times in MD and 2 to 6 times in TD.

The temperature conditions for extrusion molding and stretching can be greatly variable according to the resin used for the film. However, insofar as the stretching is not hampered, low-temperature, short-time conditions are desirable to avoid the evaporation of the anti-fogging agent.

In the invention, temperature control is especially important in annealing the stretched film. The ambient temperature must be controlled so that the film surface has a temperature of 60 to 130° C., preferably a temperature of 70 to 120° C.

It is considered that the temperature in the annealing step affects the molecular arrangement of the anti-fogging agent.

When the temperature of the film surface is less than 60° C., the anti-fogging agent incorporated into the resin used for the sealing layer may show lowered mobility, and a sufficient amount of the anti-fogging agent may not be present at the film surface. When the temperature of the film surface is more than 130° C., the anti-fogging agent may evaporate. Therefore, both conditions are considered to result in a lowered anti-fogging effect. Further, annealing at a temperature exceeding 130° C. affects the heat shrinkage of the film.

To provide heat shrinkage in the film of the invention, it is necessary to maintain the annealing temperature (at the film surface) at 60 to 130° C., more preferably at 70 to 120° C., after stretching the film. In consideration of the production conditions of actual production lines, heat shrinkage is preferably no less than 10% in MD and TD measured after the film being left to stand in hot water having a temperature of 80° C. for 30 seconds.

BEST MODE FOR CARRYING OUT THE INVENTION

Examples and Comparative Examples are given below to illustrate the invention in more detail.

The method for evaluating the immediate anti-fogging effect achieved by the invention and the results of actual packaging tests are as follows:

Evaluation of Immediate Anti-Fogging Effect

The anti-fogging property was evaluated as follows: introduce 10 µl of distilled water into a micro syringe; position the needle point thereof as close as possible to a film that is placed on a plotting paper lying horizontally with the anti-fogging surface of the film facing upward; drop the distilled water; and, 10 seconds later, measure the area of the water spread on the film in reference to the plotting paper having the grid lines.

Evaluation of Packaging Test Result 1 (Minced Beef)

The result of the packaging test was evaluated and rated as follows: introduce 200 g of minced beef into a beaker; cover the beaker with a film having its anti-fogging surface facing inside; store the beaker in a refrigerator having a temperature of −5° C. to 0° C.; and evaluate the fogging condition 15, 30 and 60 minutes later according to the following criteria.

AA: No fogging, contents clearly visible.
A: Water droplets perceivable by careful observation.
B: Large water droplets perceivable (e.g., droplets having a diameter of about 5 mm).
C: Small water droplets perceivable (e.g., droplets having a diameter of about 2 mm).
D: Complete fogging, contents hardly visible.

Evaluation of Packaging Test Result 2 (Raw Shiitake Mushroom)

The result of the packaging test was evaluated as follows: introduce 50 g of raw shiitake mushroom into a beaker; cover the beaker with a film having its anti-fogging surface facing inside; store the beaker in a cool dark space having a temperature of 15° C.; and evaluate in the same manner as in the above evaluation of packing test result 1.

Heat Shrinkage

A sample piece was cut from a film to have a dimension of 100 mm in MD and 100 mm in TD. Shrinkage of the sample was measured after the piece was left to stand for 30 seconds in water having a temperature of 80° C.

EXAMPLE 1

A flat, 5-layer film was prepared by coextruding 6-nylon resin/saponified product of ethylene-vinyl acetate copolymer (ethylene content: 32 mol %, saponification degree: 99%)/6-nylon resin/adhesive resin/linear low density polyethylene in this order through a T-die onto a chill roll wherein cooling water circulates. The resulting film was stretched 3.0 times in MD (machine direction) by a roll stretching machine heated to a temperature of 65° C., stretched 4.0 times in TD (transverse direction) by a tenter stretching machine at an ambient temperature of 110° C., and annealed by the same tenter stretching machine at an ambient temperature of 110° C. (film surface temperature: 93° C.), thereby yielding a film having a thickness of 25 µm. The thickness of each layer therein was, from outer layer to inner layer, 5/3/5/2/10 µm.

6-nylon: UBE NYLON 1022FDX10, manufactured by Ube Industries, Ltd., used for both outer and inner layers.

Saponified product of ethylene-vinyl acetate copolymer: SOARNOL DC3203BN, manufactured by The Nippon Synthetic Chemical Industry Co., Ltd.

Adhesive resin: ADMER NF518, manufactured by Mitsui Chemicals, Inc.

Linear low density polyethylene: ULTZEX 1520L, manufactured by Mitsui Chemicals, Inc.

Anti-fogging agent: 20,000 ppm of ATMER, manufactured by Uniqema, incorporated into the linear low density polyethylene resin layer.

Table 1 shows the results of the evaluation for the immediate anti-fogging effect, etc., of the stretched, multilayer film thus obtained.

EXAMPLE 2

Example Using Anti-Blocking Agent, a Lubricant and a Heat Stabilizer

A multilayer film having a thickness of 25 µm was prepared in the same manner as in Example 1 except that 2 parts by weight of an anti-blocking agent (ULTZEX AB-10, manufactured by Mitsui Chemicals, Inc.), 2 parts by weight of a lubricant (ULTZEX SQ-3, manufactured by Mitsui Chemicals, Inc.), and 2 parts by weight of a heat stabilizer (ULTZEX IR-5, manufactured by Mitsui Chemicals, Inc.) were added to the linear low density polyethylene used in Example 1. The thickness of each layer therein was, from outer layer to inner layer, 5/3/5/2/10 µm.

Table 1 shows the results of the evaluation for the immediate anti-fogging effect, etc., of the stretched, multilayer film thus obtained.

EXAMPLE 3

Example Using Poly-meta-xylylene Adipamide resin

A multilayer film having a thickness of 25 μm was prepared in the same manner as in Example 1 except that the saponified product of ethylene-vinyl acetate copolymer used in Example 1 was replaced with a poly-meta-xylylene adipamide resin prepared from meta-xylylene diamine and adipic acid. The thickness of each layer therein was, from outer layer to inner layer, 5/3/5/2/10 μm.

Table 1 shows the results of the evaluation for the immediate anti-fogging effect, etc., of the stretched, multilayer film thus obtained.

COMPARATIVE EXAMPLE 1

Example of Annealing at a Temperature of 210° C.

A multilayer film having a thickness of 25 μm was prepared in the same manner as in Example 1 except that the annealing treatment was conducted at an ambient temperature of 210° C. (film surface temperature: 187° C.). The thickness of each layer therein was, from outer layer to inner layer, 5/3/5/2/10 μm.

Table 1 shows the results of the evaluation for the immediate anti-fogging effect, etc., of the stretched, multilayer film thus obtained.

COMPARATIVE EXAMPLE 2

Example Using 5,000 ppm of Anti-Fogging Agent

A multilayer film having a thickness of 25 μm was prepared in the same manner as in Example 1 except that the amount of anti-fogging agent added to the linear low density polyethylene used in Example 1 was 5,000 ppm. The thickness of each layer therein was, from outer layer to inner layer, 5/3/5/2/10 μm.

Table 1 shows the results of the evaluation for the immediate anti-fogging effect, etc., of the stretched, multilayer film thus obtained.

COMPARATIVE EXAMPLE 3

Example of Increasing the Amounts of Additives other than the Anti-Fogging Agent A multilayer film having a thickness of 25 μm was prepared in the same manner as in Example 2 except that 8 parts by weight of an anti-blocking agent (ULTZEX AB-10, manufactured by Mitsui Chemicals, Inc.), 4 parts by weight of a lubricant (ULTZEX SQ-3, manufactured by Mitsui Chemicals, Inc.) and 4 parts by weight of a heat stabilizer (ULTZEX IR-5, manufactured by Mitsui Chemicals, Inc.) were used. The thickness of each layer therein was, from outer layer to inner layer, 5/3/5/2/10 μm.

Table 1 shows the results of the evaluation for the immediate anti-fogging effect, etc., of the stretched, multilayer film thus obtained.

TABEL 1

|  | Evaluation of immediate anti-fogging effect (mm$^2$) | Evaluation of packing test result 1 | | | Evaluation of packing test result 2 | | | Heat shrinkage (%) | |
| --- | --- | --- | --- | --- | --- | --- | --- | --- | --- |
|  |  | 15 min later | 30 min later | 60 min later | 15 min later | 30 min later | 60 min later | MD | TD |
| Example 1 | 93 | AA | AA | AA | AA | AA | AA | 17.6 | 12.8 |
| Example 2 | 52 | A | A | AA | AA | AA | AA | 15.3 | 11.0 |
| Example 3 | 84 | AA | AA | AA | AA | AA | AA | 14.7 | 11.3 |
| Comp Ex. 1 | 22 | C | C | B | — | — | — | 2.2 | 1.8 |
| Comp Ex. 2 | 16 | D | D | B | — | — | — | 18.5 | 13.7 |
| Comp Ex. 3 | 25 | B | B | A | — | — | — | 11.9 | 9.4 |

As shown in Table 1, the films of the Examples are superior in anti-fogging effect. In the packing tests simulating actual use, the films of the invention exhibit an anti-fogging effect immediately after packing. On the contrary, the films of the Comparative Examples do not exhibit an anti-fogging effect that works immediately and are inferior in anti-fogging effect for a long time. Thus, it is understood that the films of the Comparative Examples do not satisfy the desired property.

The present invention is most suitable for packing raw meats, minced meats, seafoods and the like, which are usually in such a form of sale that they are packed at a store counter and immediately displayed in a showcase. The present invention can provide a film that does not decrease the commercial value for consumers of packed products caused by the fogging of the film.

The invention claimed is:

1. An anti-fogging, stretched, multilayer film comprising a layer having an anti-fogging agent incorporated therein, the film having evaluated values for anti-fogging property of 28 mm$^2$ or more at temperatures of $-5°$ C. and $15°$ C., respectively, the film having a structure of layers in the order of polyamide resin/saponified product of ethylene-vinyl acetate copolymer/polyamide resin/modified-polyolefin adhesive resin/linear low density polyethylene resin.

2. An anti-fogging, stretched, multilayer film according to claim 1 wherein the linear low density polyethylene resin layer comprises a fatty acid ester of polyalcohol in an amount of 15,000 to 30,000 ppm and an anti-fogging agent.

3. An anti-fogging, stretched, multilayer film according to claim 1 having shrinkage rates in MD and TD of 10% or more, respectively, measured after being left to stand in water having a temperature of $80°$ C. for 30 seconds.

4. A method for preparing an anti-fogging, stretched, multilayer film of claim 1 comprising annealing a film at a film surface temperature of 60 to $130°$ C.

5. An anti-fogging film comprising at least two layers which are laminated, stretched, and annealed, one of which is a sealing layer comprises an anti-fogging agent incorporated therein, wherein, after being annealed, the sealing layer has an anti-fogging property value of 28 mm$^2$ or more as measured as an area of water spreading on a surface of the sealing layer 10 seconds after 10 $\mu$l of distilled water is dropped thereon at $-5°$ C. and $15°$ C.

6. The anti-fogging film according to claim 5, wherein the anti-fogging agent is a fatty acid ester of polyalcohols and the sealing layer is made of linear low density polyethylene.

7. The anti-fogging film according to claim 5, wherein the sealing layer comprises the anti-fogging agent in an amount of 15,000 to 30,000 ppm.

8. The anti-fogging film according to claim 5, wherein the anti-fogging agent is oriented in the sealing layer to direct its hydrophilic groups outward and its lipophilic groups inward.

9. The anti-fogging film according to claim 8, wherein the anti-fogging agent is oriented in the sealing layer by the annealing.

* * * * *